(12) United States Patent
Brokenshire et al.

(10) Patent No.: US 7,620,951 B2
(45) Date of Patent: Nov. 17, 2009

(54) HIDING MEMORY LATENCY

(75) Inventors: Daniel Alan Brokenshire, Round Rock, TX (US); Harm Peter Hofstee, Austin, TX (US); Barry L Minor, Austin, TX (US); Mark Richard Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/049,293

(22) Filed: Mar. 15, 2008

(65) Prior Publication Data

US 2008/0162906 A1 Jul. 3, 2008

Related U.S. Application Data

(63) Continuation of application No. 10/960,609, filed on Oct. 7, 2004.

(51) Int. Cl.
*G06F 9/46* (2006.01)
(52) U.S. Cl. .................. 718/100; 717/140; 717/146
(58) Field of Classification Search .............. 718/100; 717/140, 146
See application file for complete search history.

(56) References Cited

U.S. PATENT DOCUMENTS

| | | | | |
|---|---|---|---|---|
| 5,724,565 | A | 3/1998 | Dubey et al. ................ | 712/245 |
| 5,761,515 | A | 6/1998 | Barton et al. ............... | 717/158 |
| 6,526,491 | B2 | 2/2003 | Suzuoki et al. ............. | 711/164 |
| 6,549,959 | B1 | 4/2003 | Yates et al. .................. | 710/22 |
| 6,559,854 | B2 | 5/2003 | Oka et al. ................... | 345/619 |
| 7,093,109 | B1 * | 8/2006 | Davis et al. ................. | 712/228 |
| 2001/0002130 | A1 | 5/2001 | Suzuoki ...................... | 345/420 |
| 2002/0046229 | A1 | 4/2002 | Yutaka et al. ............... | 709/102 |
| 2002/0060690 | A1 | 5/2002 | Tanaka et al. .............. | 345/619 |
| 2002/0095523 | A1 | 7/2002 | Shimakawa et al. ........ | 709/316 |
| 2002/0135582 | A1 | 9/2002 | Suzuoki et al. ............. | 345/502 |
| 2002/0138637 | A1 | 9/2002 | Suzuoki et al. ............. | 709/230 |
| 2002/0138701 | A1 | 9/2002 | Suzuoki et al. ............. | 711/154 |
| 2002/0138707 | A1 | 9/2002 | Suzuoki et al. ............. | 711/163 |
| 2002/0156993 | A1 | 10/2002 | Suzuoki et al. ............... | 712/30 |
| 2003/0055984 | A1 | 3/2003 | Shimakawa et al. ........ | 709/316 |
| 2005/0086652 | A1 | 4/2005 | Tian et al. ................... | 717/151 |

OTHER PUBLICATIONS

Notice of allowance for U.S. Appl. No. 11/050,020, mailed Oct. 31, 2008, 8 pages.

* cited by examiner

*Primary Examiner*—Andy Ho
(74) *Attorney, Agent, or Firm*—VanLeeuwen & VanLeeuwen; Matthew B. Talpis (57) ABSTRACT

An approach to hiding memory latency in a multi-thread environment is presented. Branch Indirect and Set Link (BISL) and/or Branch Indirect and Set Link if External Data (BISLED) instructions are placed in thread code during compilation at instances that correspond to a prolonged instruction. A prolonged instruction is an instruction that instigates latency in a computer system, such as a DMA instruction. When a first thread encounters a BISL or a BISLED instruction, the first thread passes control to a second thread while the first thread's prolonged instruction executes. In turn, the computer system masks the latency of the first thread's prolonged instruction. The system can be optimized based on the memory latency by creating more threads and further dividing a register pool amongst the threads to further hide memory latency in operations that are highly memory bound.

20 Claims, 7 Drawing Sheets

HIDING MEMORY LATENCY

RELATED APPLICATIONS

This application is a continuation application of co-pending U.S. Non-Provisional patent application Ser. No. 10/960,609, entitled "System and Method for Hiding Memory Latency," filed on Oct. 7, 2004.

BACKGROUND OF THE INVENTION

1. Technical Field

The present invention relates in general to a system and method for hiding memory latency. More particularly, the present invention relates to a system and method for, in a multi-thread environment, passing control from a first thread to a second thread when the first thread encounters a prolonged instruction.

2. Description of the Related Art

Developers attempt to increase a computer system's performance by improving both the hardware aspects and the software aspects of the computer system. From a hardware perspective, a hardware developer may focus on improving areas such as a microprocessor's speed, bus interface speed, and memory size. From a software perspective, a developer may design an application to invoke multiple threads in order to increase the application's performance. For example, a gaming application may invoke a thread to render terrain data for the left half of a computer screen, and invoke a second thread to render terrain data for the right half of the computer screen. Each thread is given "control" at particular times and it is during these control times that a thread executes instructions.

In addition, a software developer may increase software performance by minimizing code latency. Code latency occurs when one line of code is waiting on another line of code to finish executing. There are instructions, however, that take a prolonged amount of time to execute. These "prolonged instructions" typically include operations that retrieve data from a memory area, such as a Direct Memory Access (DMA) operation. A challenge found with prolonged instructions is removing the latency that results when an application waits for the prolonged instruction to finish.

A further challenge is found when an application invokes multiple threads and one of the threads encounters a prolonged instruction. Because the thread that encountered the prolonged instruction has control, the other threads sit idle.

What is needed, therefore, is a system and method to hide a prolonged instruction's code latency in a multi-thread environment.

SUMMARY

It has been discovered that the aforementioned challenges are resolved by passing control to a second thread while a first thread processes a prolonged instruction using branch instructions. At compile time, Branch Indirect and Set Link (BISL) and/or Branch Indirect and Set Link if External Data (BISLED) instructions are placed in thread code at instances that correspond to a thread's prolonged instruction. A prolonged instruction is an instruction that may instigate latency in a computer system, such as a DMA instruction. When a first thread encounters a BISL or a BISLED instruction, the first thread passes control to a second thread while the first thread's prolonged instruction executes, thereby masking the latency of the first thread's prolonged instruction.

A computer application includes a first thread and a second thread. The first thread begins execution and encounters a prolonged instruction, such as a DMA instruction. The first thread's next instruction is either a BISL or a BISLED instruction. A BISLED instruction modifies a link register of a second thread such that when control is passed back to the first thread, the first thread checks as to whether the prolonged instruction is complete. If the prolonged instruction is not complete, the first thread continues to pass control away to the second thread until the prolonged instruction is complete. A BISL instruction modifies a link register of a second thread such that when control is passed back to the first thread, the first thread maintains control and waits for the prolonged instruction to complete.

When the first thread encounters a BISL or a BISLED instruction, the first thread determines that its prolonged instruction is still being processed, and initiates steps to branch to a second thread. The first thread stores its return address in a first register, whereby the first thread's return address corresponds to an address at which to return when control is passed back to the first thread. If the branch instruction is a BISL instruction, the first thread's return address corresponds to the instruction after the BISL instruction. If the return address is a BISLED instruction, the first thread's return address corresponds to the BISLED instruction such that when control is passed back to the first thread, the prolonged instruction condition is checked once again. The first thread retrieves the second thread's return address from a second register and passes control to the second thread.

The second thread receives control, and begins to execute its instructions. The second thread encounters a prolonged instruction and begins to execute the prolonged instruction. The second thread identifies that its next instruction is either a BISL or a BISLED instruction. As such, the second thread stores the second thread's return address in the second register, and retrieves the first thread's return address from the first register. The second thread passes control to the first thread at the first thread's return address, whereby the first thread executes its instructions. This cyclical loop continues between the first thread and the second thread in order to hide memory latency that both threads encounter when they perform a prolonged instruction.

BISL and BISLED instructions may be inserted into a software program either manually or automatically. For example, when a developer is writing a program in machine code, the developer may manually insert BISL and BISLED instructions after prolonged instructions. In another example, when a developer is writing a program in a high-level programming language, a compiler may automatically insert BISL and BISLED instructions for particular co-routines.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
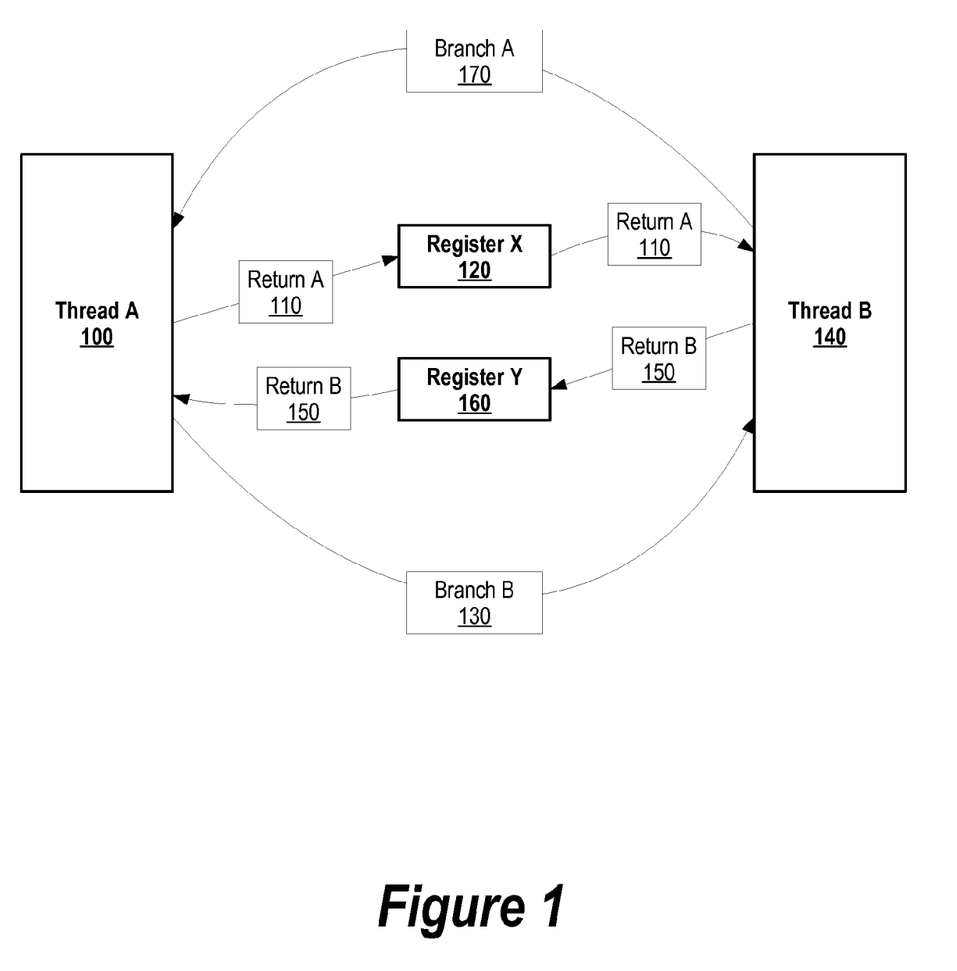
FIG. 1 is a diagram showing two threads branching to each other when the threads encounter a prolonged instruction.

FIG. 1 is a diagram showing two threads branching to each other when the threads encounter a prolonged instruction. While the example shown in FIG. 1 includes two threads, the invention described herein is not limited to two threads and, as one skilled in the art can appreciate, the invention is applicable to any number of multiple threads. At compile time, Branch Indirect and Set Link (BISL) and/or Branch Indirect and Set Link if External Data (BISLED) instructions are placed in thread code at instances that correspond to a thread's prolonged instruction. A prolonged instruction is an instruction that may instigate latency in a computer system, such as a DMA instruction. When a first thread encounters a BISL or a BISLED instruction, the first thread passes control to a second thread while the first thread's prolonged instruction executes. In turn, the computer system masks the latency of the first thread's prolonged instruction (see FIGS. 2A, 2B, and corresponding text for further details regarding branch instruction placement).

A BISLED instruction modifies a link register of another thread by two instructions so that processing returns to the BISLED instruction in order to check whether the prolonged instruction is complete. If the prolonged instruction is not complete, the thread continues to pass control away to another thread until the prolonged instruction is complete. With a BISL instruction, the thread passes control away to another thread once, and then waits until control comes back to the thread. Once control is passed back, the thread waits until the prolonged instruction is complete and then proceeds to process more instructions.

FIG. 1 shows two threads, which are thread A 100 and thread B 140. Both threads include BISL and/or BISLED instructions. Thread A 100 encounters a prolonged instruction, such as a DMA instruction, and begins processing the prolonged instruction. Thread A 100's next instruction is either a BISL or a BISLED instruction.

As such, thread A 100 determines that the prolonged instruction is still being processed, and, therefore, thread A 100 initiates the steps to branch to thread B 140. Thread A 100 stores return A 110 in register X 120, whereby return A 110 corresponds to an address for which to return when control is passed back to thread A 100. If the branch instruction is a BISL instruction, return A 110 corresponds to the instruction after the BISL instruction. If the return address is a BISLED instruction, return A 110 corresponds to the BISLED instruction such that when control is passed back to thread A 100, the prolonged instruction condition is checked once again. Thread A 100 retrieves return B 150 from register Y 160 and instigates branch B 130. Return B 150 is thread B 140's return address to which thread A branches. Register X 120 and register Y 160 may be stored on a volatile storage area, such as internal memory.

Thread B 140 executes its instructions, and encounters a prolonged instruction. Thread B 140 begins executing the prolonged instruction, and identifies its next instruction as either a BISL or a BISLED instruction. As such, thread B 140 stores a return address (i.e. return B 150) in register Y 160 that corresponds to the location at which to resume processing when control is passed back to thread B 140. Thread B 140 retrieves return A 110 from register X 120 and branches (i.e. branch A 170) to thread A 100 using return A 110. This cyclical loop continues between thread A 100 and thread B 140 in order to hide memory latency that both threads encounter when they perform a prolonged instruction.

BISL and BISLED instructions may be inserted into a software program either manually or automatically. For example, when a developer is writing a program in machine code, the developer may manually insert BISL and BISLED instructions after prolonged instructions. In another example, when a developer is writing a program in a high-level programming language, a compiler may automatically insert BISL and BISLED instructions for particular co-routines.

Figure 2A:
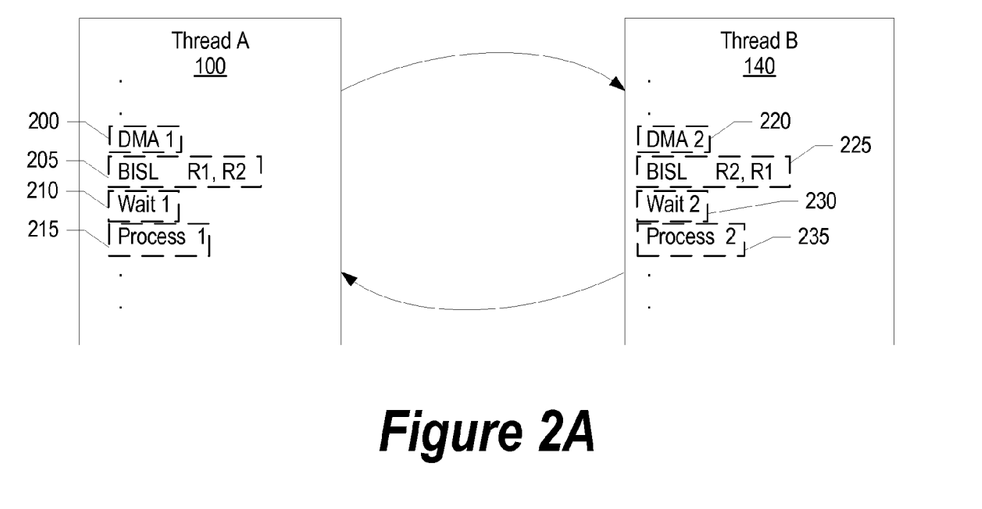
FIG. 2A is a diagram showing two threads that include a branch indirect and set link instruction (BISL)

FIG. 2A is a diagram showing two threads that include a branch indirect and set link instruction (BISL). Thread A 100 and thread B 140 are the same as that shown in FIG. 1, and both include a BISL instruction in order to hide memory latency when the two threads execute a prolonged instruction. Using a BISL instruction, a first thread passes control to a second thread while the first thread processes a prolonged instruction. When control is passed back to the first thread, the first thread waits until the prolonged instruction finishes, and then continues to execute the first thread's instructions.

Thread A 100 includes code lines 200 through 215. Thread A 100 executes a prolonged instruction (i.e. DMA 1) at code line 200. Code line 205 includes a BISL instruction whereby thread A 100 stores a return address in register "R2" which corresponds to the next code line (i.e. code line 210). In addition, thread A 100 retrieves a "branch to" address from register "R1." At this point, control is passed to thread B 140 until thread B 140 encounters a branch instruction.

Thread B 140 includes code lines 220 through 235. When control is passed to thread B 140, thread B begins execution of its instructions. Thread B 140 arrives at code line 220, which is a prolonged instruction, and begins executing the prolonged instruction. Code line 225 includes a BISL instruction whereby thread B 140 stores a return address in register "R1" and retrieves a "branch to" address from register "R2." The branch to address in R2 is the return address in which thread A 100 previously stored (see above).

Control is passed to thread A 100 whereupon thread A 100 executes code lines 210, 215, and so on. When thread A 100 encounters another branch instruction, control is passed to thread B 140 whereupon thread B 140 executes code lines 230, 235, and so on.

Figure 2B:
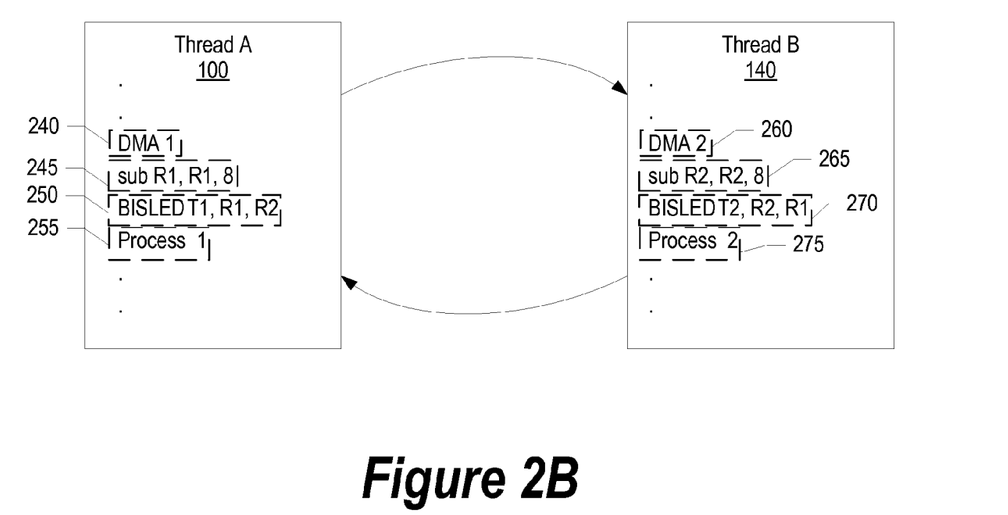
FIG. 2B is a diagram showing two threads that include a branch indirect and set link if external data instruction (BISLED)

FIG. 2B is a diagram showing two threads that include a branch indirect and set link if external data instruction (BISLED). Thread A 100 and thread B 140 are the same as that shown in FIG. 1, and both include a BISLED instruction in order to hide memory latency when the two threads execute a prolonged instruction. A BISLED instruction differs from a BISL instruction (see FIG. 2A) in that when processing returns to the BISLED instruction, the prolonged condition is checked once again to determine if it has completed. If the prolonged instruction is not complete, the thread continues to pass control away to another thread until the prolonged instruction is complete.

Thread A 100 includes code lines 240 through 255. Thread A 100 executes a prolonged instruction (i.e. DMA 1) at code line 240. At code line 245, processing subtracts eight bytes from a return value corresponding to thread B 140 such that when control is passed back to thread B 140, a condition is checked again by thread B 140's BISLED instruction. Code line 250 includes a BISLED instruction that includes an external condition tag "T1", a return address "R2", and a branch to address "R1". Thread A 100 stores the return address in register "R2" which corresponds to code line 255. Thread B 140, however, will modify this value by subtracting two instructions (code line 265) such that when control is passed back to thread A 100, thread A 100 will start at code line 245. Therefore, when control is passed back to thread A 100, the BISLED instruction on code line 250 checks external condition tag "T1" which indicates whether the prolonged instruction is complete. If the prolonged instruction is not complete, thread A 100 passes control back to thread B 140. If the prolonged instruction is complete, thread A 100 continues instruction execution (i.e. code line 255). Thread A 100 retrieves a "branch to" address from register "R1" and passes control to thread B 140.

Thread B 140 includes code lines 260 through 275. When control is passed to thread B 140, thread B starts to execute its instructions. Thread B 140 arrives at code line 260, which is a prolonged instruction. At code line 265, processing subtracts eight bytes from a return value corresponding to thread A 100 such that when control is passed back to thread A 100, a condition is checked again by thread A 100's BISLED instruction (code line 250).

Code line 270 includes a BISLED instruction that includes an external condition tag "T2", a return address "R1", and a branch to address "R2". Thread B 140 stores the return address in register "R1" which corresponds to code line 275. Thread A 100, however, modifies this value by subtracting two instructions (code line 245) such that when control is passed back to thread B 140, thread B 140 starts processing at code line 265. In turn, the BISLED instruction in code line 270 checks external condition tag "T2" which indicates whether the prolonged instruction is complete. If the prolonged instruction is not complete, thread B 140 passes control back to thread A 100. If the prolonged instruction is complete, thread B 140 continues instruction execution (i.e. code line 275).

Figure 3:
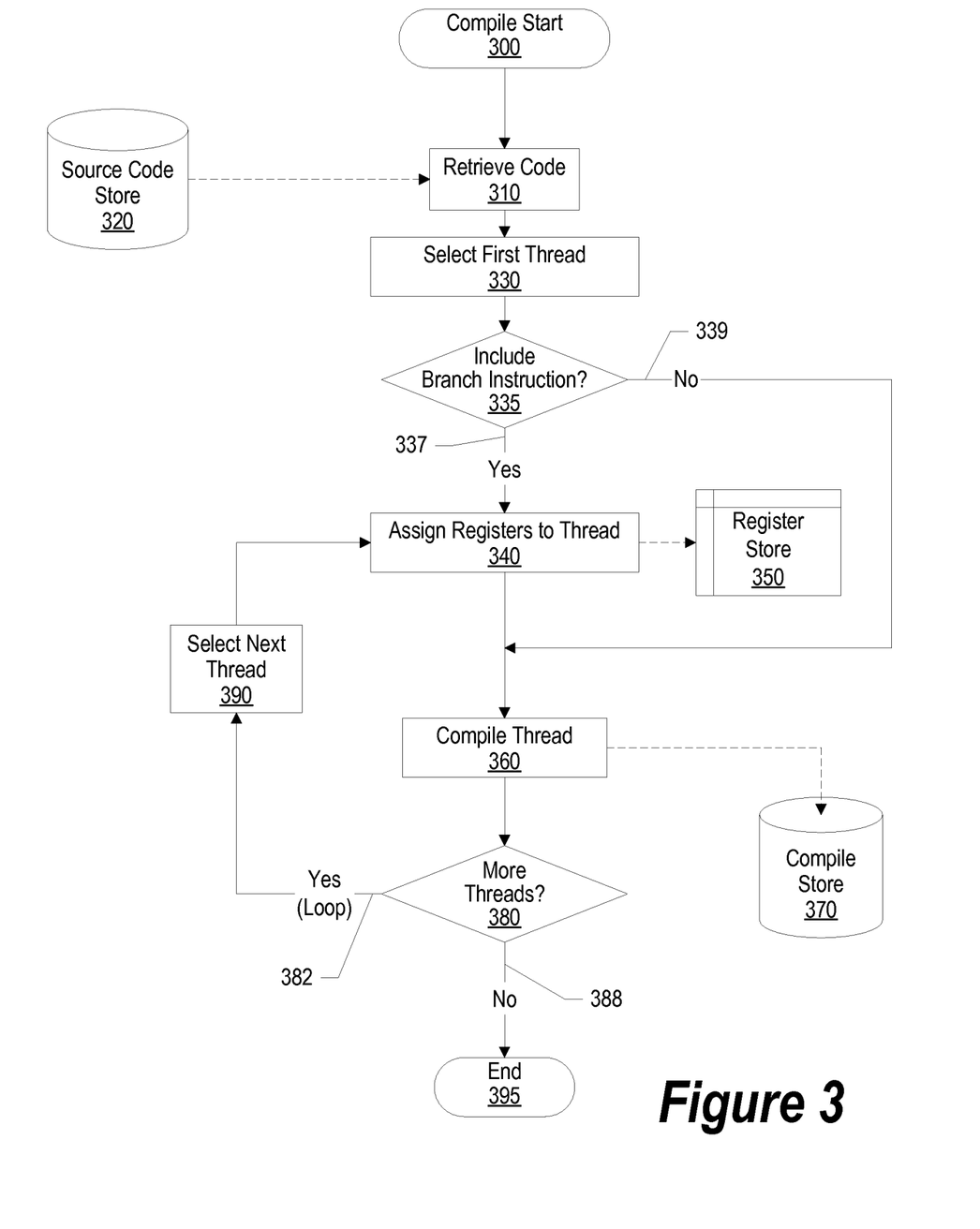
FIG. 3 is flowchart showing steps taken in compiling threads and assigning registers to the threads that include branch instructions.

FIG. 3 is flowchart showing steps taken in compiling threads and assigning registers to the threads that include Branch Indirect and Set Link (BISL) and/or Branch Indirect and Set Link if External Data (BISLED) instructions. At compile BISL and/or BISLED instructions are inserted in code at places that correspond to a particular thread's prolonged instructions. BISL and BISLED instructions may be inserted into a software program either manually or automatically. For example, when a developer is writing a program in machine code, the developer may manually insert BISL and BISLED instructions after prolonged instructions. In another example, when a developer is writing a program in a high-level programming language, a compiler may automatically insert BISL and BISLED instructions for particular co-routines. The BISL and BISLED instructions cause a first thread to branch to a second thread while the first thread's prolonged instruction executes. For example, a BISL instruction may be placed after a thread's DMA instruction whereby processing branches to a different thread while the DMA instruction executes.

Compile processing commences at 300, whereupon processing retrieves source code from source code store 320 at step 310. Source code store 320 may be stored on a nonvolatile storage area, such as a computer hard drive. At step 330, processing selects a first thread that is included in the source code. A determination is made as to whether the thread includes a BISL or a BISLED instruction (decision 335).

If the thread includes a BISL or a BISLED instruction, decision 330 branches to "Yes" branch 337 whereupon processing assigns a plurality of registers located in register store 350 to the thread (step 340). The thread uses one of the plurality of registers to store a return address and uses another one of the plurality of registers to identify an address location to branch to a second thread. For example, when a first thread encounters a BISL or a BISLED instruction, the first thread stores a return address in one of its assigned registers, and then retrieves an address from another one of its registers that corresponds to a target address of a second thread (see FIGS. 1, 2A, 2B, 4, and corresponding text for further details regarding thread branching).

On the other hand, if the selected thread does not include a BISL or a BISLED instruction, decision 335 branches to "No" branch 339 bypassing register assigning steps. At step 360, processing compiles the thread and stores the compiled code in compile store 370. Compile store 370 may be stored on a nonvolatile storage area, such as a computer hard drive.

A determination is made as to whether there are more threads in the source code to compile (decision 380). If there are more threads in the source code to compile, decision 380 branches to "Yes" branch 382 which loops back to select (step 390) and process a next thread. This looping continues until there are no more threads to compile, at which point decision 380 branches to "No" branch 388 whereupon compile processing ends at 395.

Figure 4:
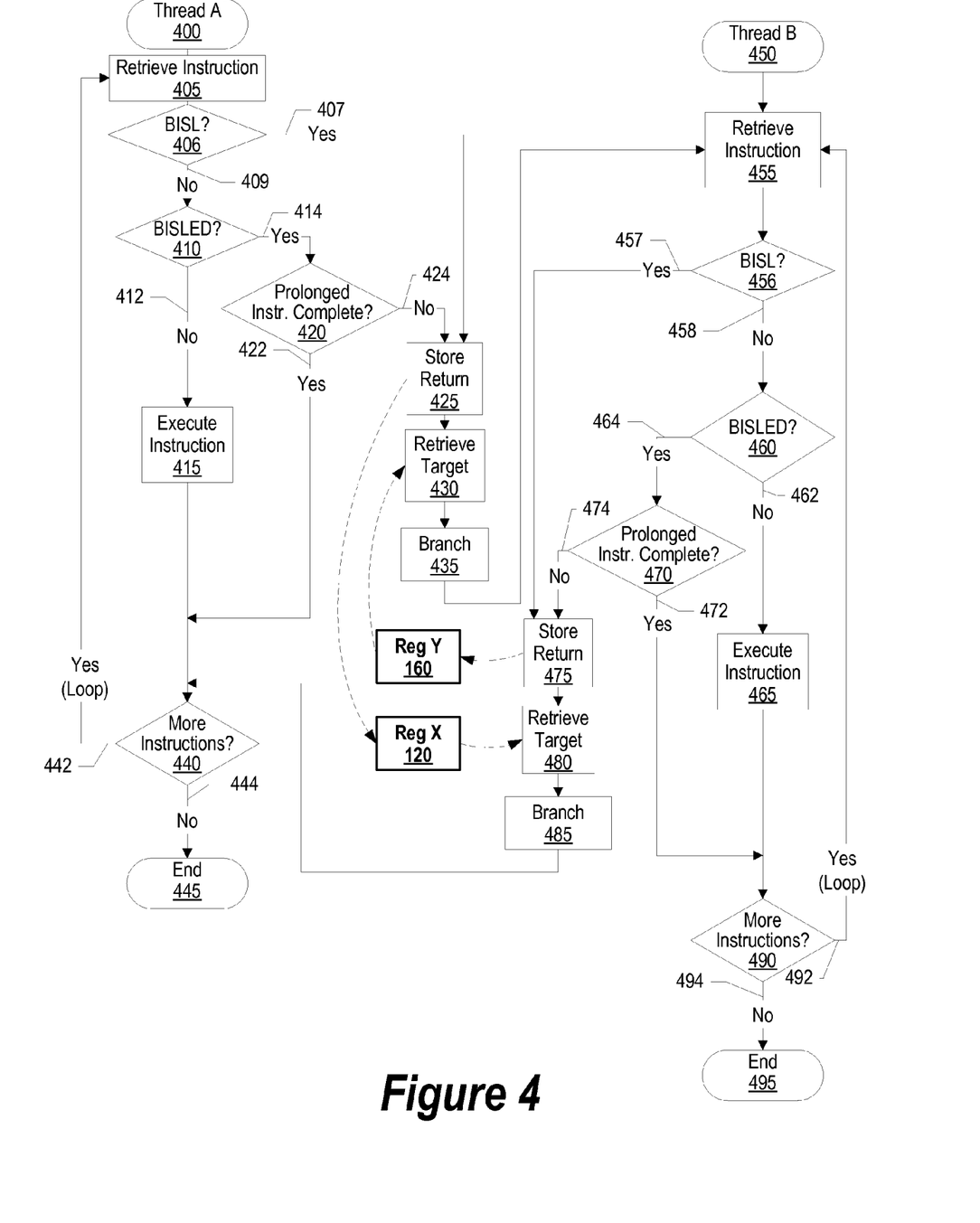
FIG. 4 is a flowchart showing steps taken in two threads branching to each other when the threads encounter a prolonged instruction.

FIG. 4 is a flowchart showing steps taken in two threads branching to each other when the threads encounter a prolonged instruction. Thread A processing commences at 400, whereupon processing retrieves an instruction at step 405. A determination is made as to whether the instruction is a Branch Indirect and Set Link (BISL) instruction (decision 406). If the instruction is a BISL instruction, decision 406 branches to "Yes" branch 407 whereupon processing begins steps to branch to thread B (see below).

On the other hand, if the instruction is not a BISL instruction, decision 406 branches to "No" branch 409 whereupon a determination is made as to whether the instruction is a Branch Indirect and Set Link if External Data (BISLED) instruction (decision 410). If the instruction is not a BISLED instruction, decision 410 branches to "No" branch 412 whereupon processing executes the instruction at step 415. On the other hand, if the instruction is a BISLED instruction, decision 410 branches to "Yes" branch 414 whereupon a determination is made as to whether a prolonged instruction prior to the branch instruction is complete (decision 420). For example, a prolonged instruction may be a DMA instruction, and processing determines whether the DMA instruction is complete. If the prolonged instruction is complete, decision 420 branches to "Yes" branch 422 whereupon thread A maintains control and continues processing.

On the other hand, if the prolonged instruction is not complete, decision 420 branches to "No" branch 424 whereupon processing stores thread A's return address in register X 120 (step 425). Register X 120 is the same as that shown in FIG. 1. Processing retrieves a target address from register Y 160 at step 430. The target address is the address for which thread A should branch to thread B. The target address was stored in register Y 160 when thread B branched to thread A. At step 435, processing branches and passes control to thread B. Register Y 160 is the same as that shown in FIG. 1.

Thread B processing commences at 450, whereupon processing retrieves an instruction at step 455. A determination is made as to whether the instruction is a BISL instruction (decision 456). If the instruction is a BISL instruction, decision 456 branches to "Yes" branch 456 whereupon processing begins steps to branch back to thread A (see below). On the other hand, if the instruction is not a BISL instruction, decision 456 branches to "No" branch 458 whereupon a determination is made as to whether the instruction is a Branch Indirect and Set Link if External Data (BISLED) instruction (decision 460).

If the instruction is not a BISLED instruction, decision 460 branches to "No" branch 462 whereupon processing executes the instruction at step 465. On the other hand, if the instruction is a BISLED instruction, decision 460 branches to "Yes" branch 464 whereupon a determination is made as to whether a prolonged instruction prior to the branch instruction is complete (decision 470). For example, a prolonged instruction may be a DMA instruction, and processing determines whether the DMA instruction is complete. If the prolonged instruction is complete, decision 470 branches to "Yes" branch 472 whereupon thread B maintains control and continues processing.

On the other hand, if the prolonged instruction is not complete, decision 470 branches to "No" branch 474 whereupon processing stores thread B's return address in register Y 160 (step 475). Processing retrieves a target address from register X 120 at step 480 which is the return address that thread A previously stored (see above). At step 485, processing branches to thread A's return address and passes control to thread A.

A determination is made as to whether thread A has more instructions to execute (decision 440). If thread A has more instructions to execute, decision 440 branches to "Yes" branch 442 whereupon processing executes the next instruction. This looping continues until thread A has no more instructions to execute, at which point decision 440 branches to "No" branch 444 whereupon thread A ends at 445.

Likewise, a determination is made as to whether thread B has more instructions to execute (decision 490). If thread B has more instructions to execute, decision 490 branches to "Yes" branch 492 whereupon processing executes the next instruction. This looping continues until thread B has no more instructions to execute, at which point decision 490 branches to "No" branch 494 whereupon thread B ends at 495.

Figure 5:
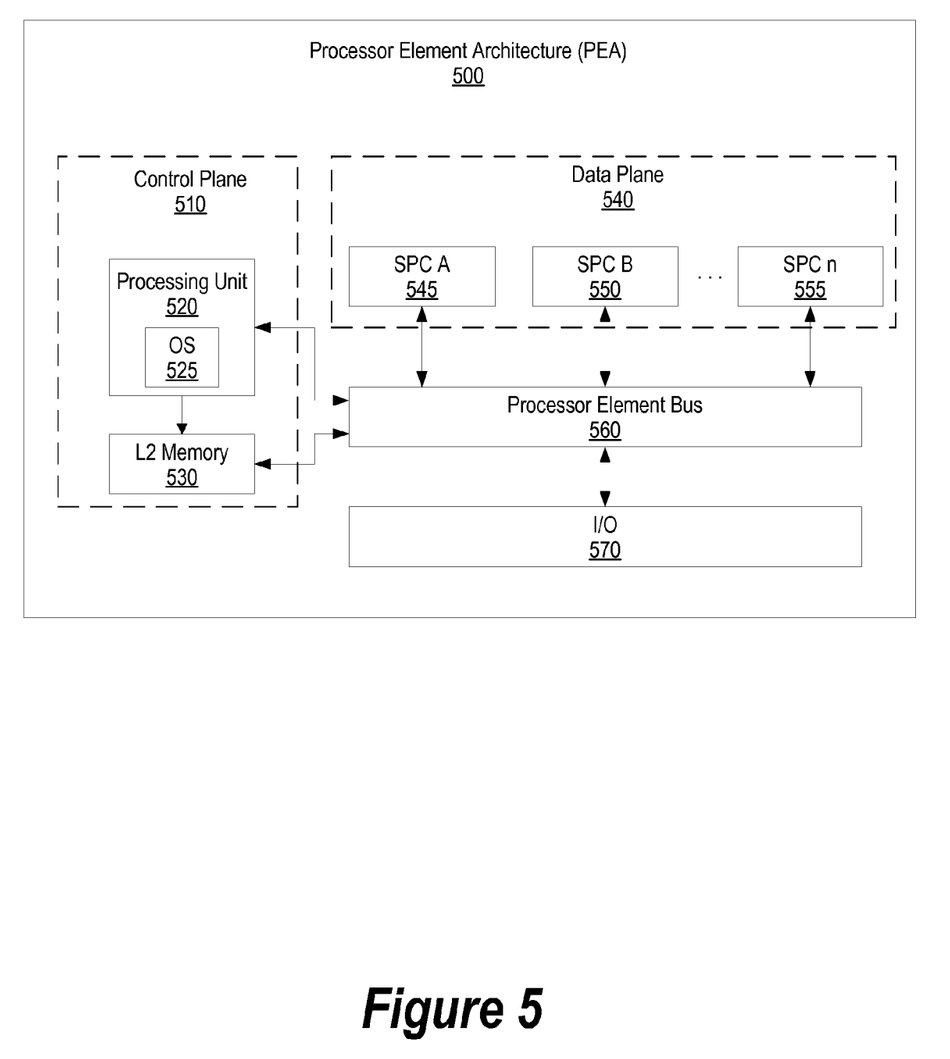
FIG. 5 is a diagram showing a processor element architecture that includes a plurality of heterogeneous processors.

FIG. 5 is a diagram showing a processor element architecture that includes a plurality of heterogeneous processors. The heterogeneous processors share a common memory and a common bus. Processor element architecture (PEA) 500 sends and receives information to/from external devices through input output 570, and distributes the information to control plane 510 and data plane 540 using processor element bus 560. Control plane 510 manages PEA 500 and distributes work to data plane 540.

Control plane 510 includes processing unit 520 which runs operating system (OS) 525. For example, processing unit 520 may be a Power PC core that is embedded in PEA 500 and OS 525 may be a Linux operating system. Processing unit 520 manages a common memory map table for PEA 500. The memory map table corresponds to memory locations included in PEA 500, such as L2 memory 530 as well as non-private memory included in data plane 540 (see FIG. 6A, 6B, and corresponding text for further details regarding memory mapping).

Data plane 540 includes Synergistic Processing Complex's (SPC) 545, 550, and 555. Each SPC is used to process data information and each SPC may have different instruction sets. For example, PEA 500 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU) which is a processing core, such as a digital signal processor, a microcontroller, a microprocessor, or a combination of these cores.

SPC 545, 550, and 555 are connected to processor element bus 560 which passes information between control plane 510, data plane 540, and input/output 570. Bus 560 is an on-chip coherent multi-processor bus that passes information between I/O 570, control plane 510, and data plane 540. Input/output 570 includes flexible input-output logic which dynamically assigns interface pins to input output controllers based upon peripheral devices that are connected to PEA 500. For example, PEA 500 may be connected to two peripheral devices, such as peripheral A and peripheral B, whereby each peripheral connects to a particular number of input and output pins on PEA 500. In this example, the flexible input-output logic is configured to route PEA 500's external input and output pins that are connected to peripheral A to a first input output controller (i.e. IOC A) and route PEA 500's external input and output pins that are connected to peripheral B to a second input output controller (i.e. IOC B).

Figure 6A:
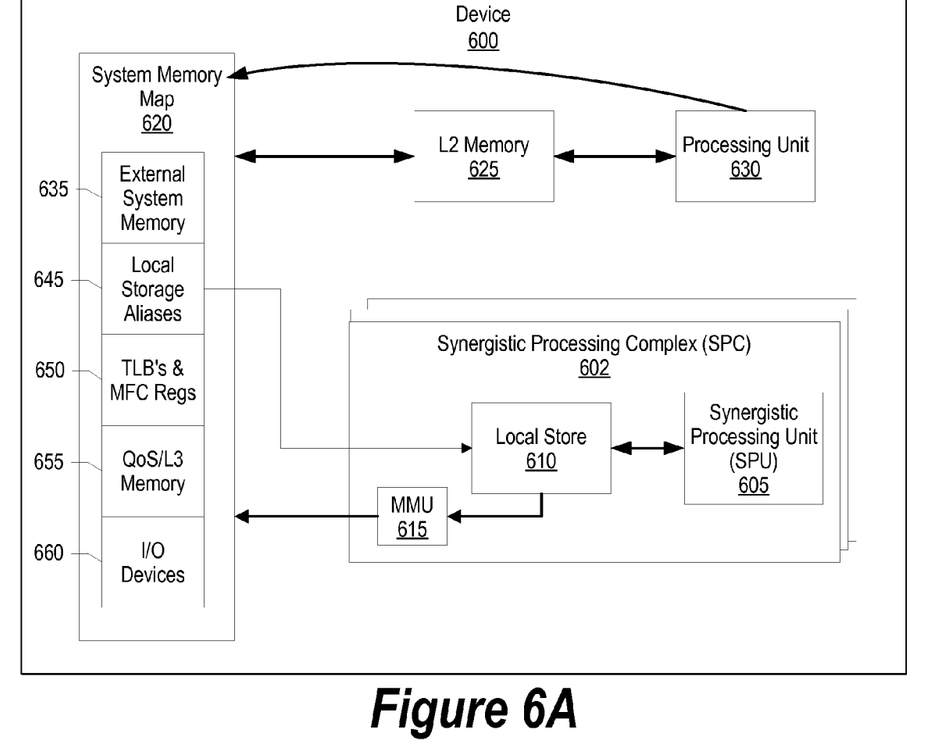
FIG. 6A illustrates a first information handling system which is a simplified example of a computer system capable of performing the computing operations described herein.

FIG. 6A illustrates an information handling system which is a simplified example of a computer system capable of performing the computing operations described herein. The example in FIG. 6A shows a plurality of heterogeneous processors, such as those shown in FIG. 5, using a common memory map in order to share memory between the heterogeneous processors. Device 600 includes processing unit 630 which executes an operating system for device 600. Processing unit 630 is similar to processing unit 520 shown in FIG. 5. Processing unit 630 uses system memory map 620 to allocate memory space throughout device 600. For example, processing unit 630 uses system memory map 620 to identify and allocate memory areas when processing unit 630 receives a memory request. Processing unit 630 accesses L2 memory 625 for retrieving application and data information. L2 memory 625 is similar to L2 memory 530 shown in FIG. 5.

System memory map 620 separates memory mapping areas into regions which are regions 635, 645, 650, 655, and 660. Region 635 is a mapping region for external system memory which may be controlled by a separate input output device. Region 645 is a mapping region for non-private storage locations corresponding to one or more synergistic processing complexes, such as SPC 602. SPC 602 is similar to the SPC's shown in FIG. 5, such as SPC A 545. SPC 602 includes local memory, such as local store 610, whereby portions of the local memory may be allocated to the overall system memory for other processors to access. For example, 1 MB of local store 610 may be allocated to non-private storage whereby it becomes accessible by other heterogeneous processors. In this example, local storage aliases 645 manages the 1 MB of nonprivate storage located in local store 610 (see FIG. 6B and corresponding text for further details regarding local store accessibility).

Region 650 is a mapping region for translation lookaside buffer's (TLB's) and memory flow control (MFC registers. A translation lookaside buffer includes cross-references between virtual address and real addresses of recently referenced pages of memory. The memory flow control provides interface functions between the processor and the bus such as DMA control and synchronization.

Region 655 is a mapping region for the operating system and is pinned system memory with bandwidth and latency guarantees. Region 660 is a mapping region for input output devices that are external to device 600 and are defined by system and input output architectures.

Synergistic processing complex (SPC) 602 includes synergistic processing unit (SPU) 605, local store 610, and memory management unit (MMU) 615. Processing unit 630 manages SPU 605 and processes data in response to processing unit 630's direction. For example SPU 605 may be a digital signaling processing core, a microprocessor core, a micro controller core, or a combination of these cores. Local store 610 is a storage area that SPU 605 configures for a private storage area and a non-private storage area. For example, if SPU 605 requires a substantial amount of local memory, SPU 605 may allocate 100% of local store 610 to private memory. In another example, if SPU 605 requires a minimal amount of local memory, SPU 605 may allocate 10% of local store 610 to private memory and allocate the remaining 90% of local store 610 to non-private memory (see FIG. 6B and corresponding text for further details regarding local store configuration).

The portions of local store 610 that are allocated to non-private memory are managed by system memory map 620 in region 645. These non-private memory regions may be accessed by other SPU's or by processing unit 630. MMU 615 includes a direct memory access (DMA) function and passes information from local store 610 to other memory locations within device 600.

Figure 6B:
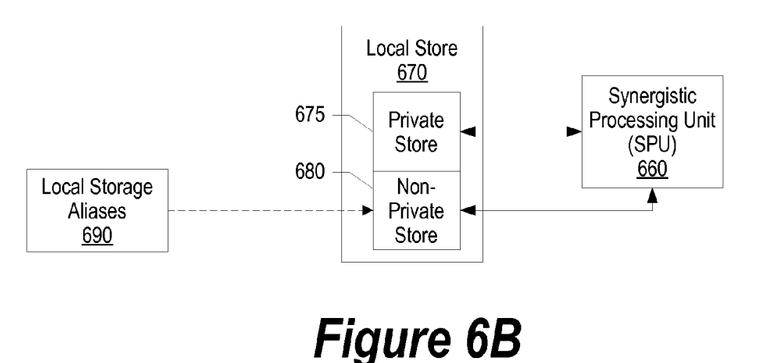
FIG. 6B is a diagram showing a local storage area divided into private memory and non-private memory.

FIG. 6B is a diagram showing a local storage area divided into private memory and non-private memory. During system boot, synergistic processing unit (SPU) 660 partitions local store 670 into two regions which are private store 675 and non-private store 680. SPU 660 is similar to SPU 605 and local store 670 is similar to local store 610 that are shown in FIG. 6A. Private store 675 is accessible by SPU 660 whereas non-private store 680 is accessible by SPU 660 as well as other processing units within a particular device. SPU 660 uses private store 675 for fast access to data. For example, SPU 660 may be responsible for complex computations that require SPU 660 to quickly access extensive amounts of data that is stored in memory. In this example, SPU 660 may allocate 100% of local store 670 to private store 675 in order to ensure that SPU 660 has enough local memory to access. In another example, SPU 660 may not require a large amount of local memory and therefore, may allocate 10% of local store 670 to private store 675 and allocate the remaining 90% of local store 670 to non-private store 680.

A system memory mapping region, such as local storage aliases 690, manages portions of local store 670 that are allocated to non-private storage. Local storage aliases 690 is similar to local storage aliases 645 that is shown in FIG. 6A. Local storage aliases 690 manages non-private storage for each SPU and allows other SPU's to access the non-private storage as well as a device's control processing unit.

Figure 7:
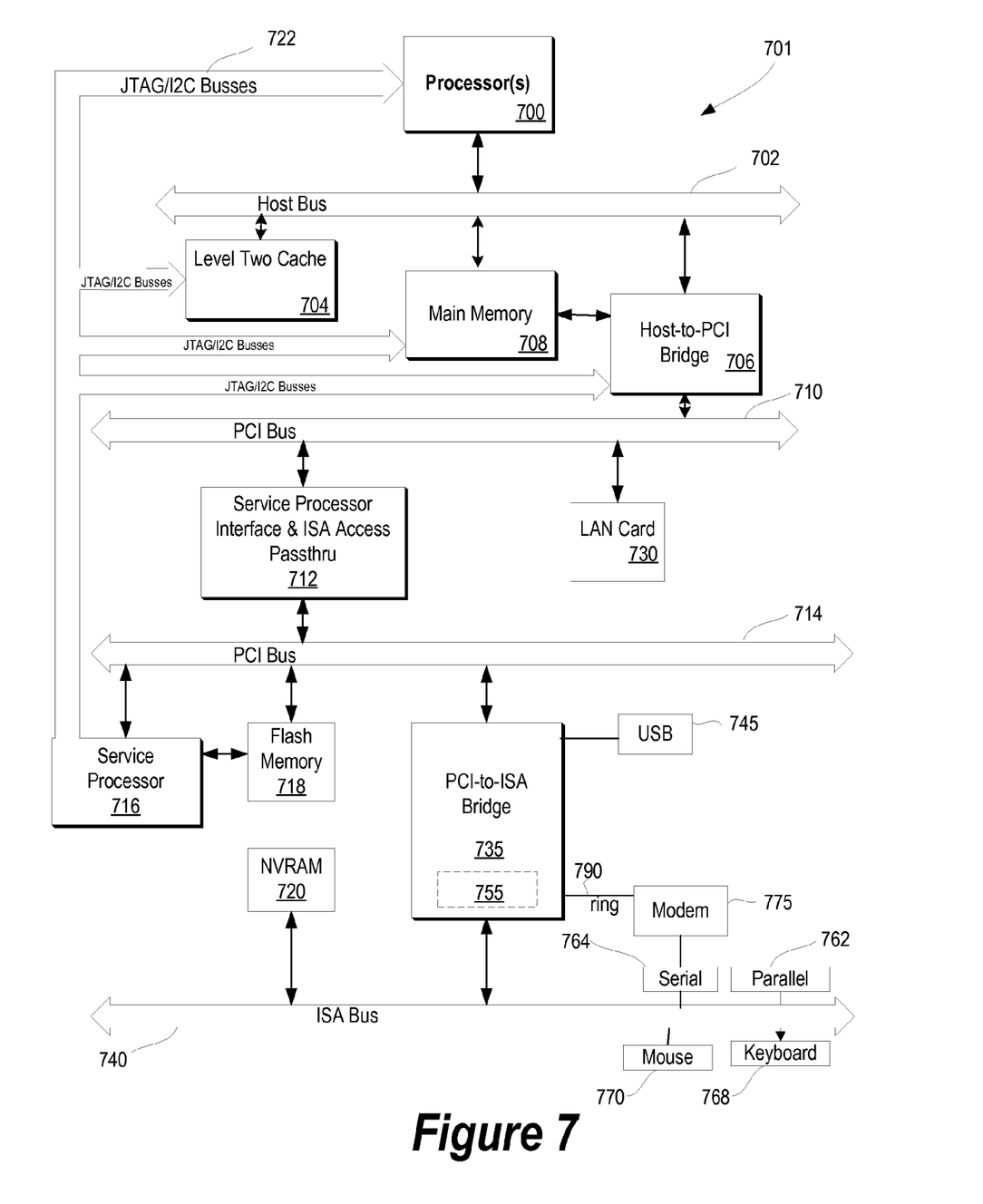
FIG. 7 is a block diagram of a second information handling system capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIGS. 5, 6A, 6B, and 7 are capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
retrieving a source code file from a source code store, the source code file including a plurality of threads, the plurality of threads including a first thread and a second thread;
detecting, by a compiler, a prolonged instruction included in the second thread;
inserting, by the compiler, a branch instruction immediately after the prolonged instruction;
compiling the source code, the compiling resulting in an executable program;
executing the executable program on a processor, wherein the executing comprises:
executing the prolonged instruction;
in response to executing the prolonged instruction, executing the branch instruction that was inserted immediately after the prolonged instruction;
in response to executing the branch instruction, branching to the first thread using a first return address that corresponds to the first thread.

2. The method of claim 1 further comprising:
assigning, by the compiler, a plurality of registers included in the processor to the first thread and the second thread, wherein, during execution, a first register from the plurality of registers for the first thread includes the first return address; and
in response to the branching, storing a second return address in a second register from the plurality of registers that corresponds to the second thread.

3. The method of claim 2 further comprising:
retrieving the second return address; and
returning to the second thread from the first thread at the second return address.

4. The method of claim 2 further comprising:
determining whether the prolonged instruction for the second thread is complete; and
branching back to the first thread in response to the determination.

5. The method of claim 2 further comprising:
storing the first return address in the first register; and
branching to the second thread.

6. The method of claim 1 wherein the branch instruction is selected from the group consisting of a branch indirect and set link instruction and a branch indirect and set link if external data instruction.

7. The method of claim 1 wherein the prolonged instruction is a direct memory access instruction.

8. A computer program product stored in a computer memory, comprising functional descriptive material that, when executed by a data processing system, causes the data processing system to perform actions comprising:
retrieving a source code file from a source code store, the source code file including a plurality of threads, the plurality of threads including a first thread and a second thread;
detecting, by a compiler, a prolonged instruction included in the second thread;
inserting, by the compiler, a branch instruction immediately after the prolonged instruction;
compiling the source code, the compiling resulting in an executable program;
executing the executable program on a processor, wherein the executing comprises:
executing the prolonged instruction;
in response to executing the prolonged instruction, executing the branch instruction that was inserted immediately after the prolonged instruction;
in response to executing the branch instruction, branching to the first thread using a first return address that corresponds to the first thread.

9. The computer program product of claim 8 wherein the actions further comprise:
assigning, by the compiler, a plurality of registers included in the processor to the first thread and the second thread, wherein, during execution, a first register from the plurality of registers for the first thread includes the first return address; and
in response to the branching, storing a second return address in a second register from the plurality of registers that corresponds to the second thread.

10. The program product of claim 9 wherein the actions further comprise:
retrieving the second return address; and
returning to the second thread from the first thread at the second return address.

11. The program product of claim 9 wherein the actions further comprise:
determining whether the prolonged instruction for the second thread is complete; and
branching back to the first thread in response to the determination.

12. The program product of claim 9 wherein the actions further comprise:
storing the first return address in the first register; and
branching to the second thread.

13. The program product of claim 8 wherein the branch instruction is selected from the group consisting of a branch indirect and set link instruction and a branch indirect and set link if external data instruction.

14. The program product of claim 8 wherein the prolonged instruction is a direct memory access instruction.

15. An information handling system comprising:
- a display;
- one or more processors;
- a local memory area;
- a main memory area accessible by one or more of the processors; and
- a thread control management tool for managing thread control, the thread control management tool comprising software code effective to:
  - retrieve a source code file from a source code store, the source code file including a plurality of threads, the plurality of threads including a first thread and a second thread;
  - detect, by a compiler, a prolonged instruction included in the second thread;
  - insert, by the compiler, a branch instruction immediately after the prolonged instruction;
  - compile the source code, the compiling resulting in an executable program;
  - execute the executable program on the one or more processors, wherein the executing comprises software code effective to:
    - execute the prolonged instruction;
    - in response to executing the prolonged instruction, execute the branch instruction that was inserted immediately after the prolonged instruction;
    - in response to executing the branch instruction, branch to the first thread using a first return address that corresponds to the first thread.

16. The information handling system of claim 15 wherein the software code is further effective to:
- assign, by the compiler, a plurality of registers included in the processor to the first thread and the second thread, wherein, during execution, a first register from the plurality of registers for the first thread includes the first return address; and
- in response to the branching, store a second return address in a second register from the plurality of registers that corresponds to the second thread.

17. The information handling system of claim 16 wherein the software code is further effective to:
- retrieve the second return address from the second register; and
- return to the second thread from the first thread at the second return address.

18. The information handling system of claim 16 wherein the software code is further effective to:
- determine whether the prolonged instruction for the second thread is complete; and
- branch back to the first thread in response to the determination.

19. The information handling system of claim 16 wherein the software code is further effective to:
- store the first return address in the first register; and
- branch to the second thread.

20. The information handling system of claim 15 wherein the branch instruction is selected from the group consisting of a branch indirect and set link instruction and a branch indirect and set link if external data instruction.

* * * * *